(12) United States Patent
Koschabek et al.

(10) Patent No.: US 9,200,233 B2
(45) Date of Patent: Dec. 1, 2015

(54) (METH)ACRYLATE POLYMERS FOR IMPROVING THE VISCOSITY INDEX

(75) Inventors: Rene Koschabek, Weinheim (DE);
Sandra Kuenzel, Otzberg (DE);
Markus Weber, Brensbach (DE);
Thorsten Bartels, Weisenheim (DE);
Christoph Wincierz, Darmstadt (DE)

(73) Assignee: Evonik RohMax Additives GmbH, Darmstadt (DE)

( * ) Notice: Subject to any disclaimer, the term of this patent is extended or adjusted under 35 U.S.C. 154(b) by 290 days.

(21) Appl. No.: 13/511,031

(22) PCT Filed: Dec. 8, 2010

(86) PCT No.: PCT/EP2010/069113
§ 371 (c)(1),
(2), (4) Date: May 21, 2012

(87) PCT Pub. No.: WO2011/088929
PCT Pub. Date: Jul. 28, 2011

(65) Prior Publication Data
US 2012/0302476 A1      Nov. 29, 2012

(30) Foreign Application Priority Data

Jan. 20, 2010  (DE) .......................... 10 2010 001 040

(51) Int. Cl.
| | | |
|---|---|---|
| *C10M 145/14* | (2006.01) | |
| *C08F 220/18* | (2006.01) | |
| *C08F 220/28* | (2006.01) | |
| *C10M 169/04* | (2006.01) | |

(52) U.S. Cl.
CPC ............ *C10M 145/14* (2013.01); *C08F 220/18* (2013.01); *C08F 220/28* (2013.01); *C10M 169/041* (2013.01); *C10M 2209/084* (2013.01); *C10M 2209/1033* (2013.01); *C10M 2209/1075* (2013.01); *C10N 2220/021* (2013.01); *C10N 2230/02* (2013.01); *C10N 2230/041* (2013.01)

(58) Field of Classification Search
USPC ........................................................ 508/469
See application file for complete search history.

(56) References Cited

U.S. PATENT DOCUMENTS

| | | | |
|---|---|---|---|
| 2,892,820 | A | 6/1959 | Stewart et al. |
| 3,052,648 | A | 9/1962 | Bauer |
| 3,251,775 | A | 5/1966 | Bauer |
| 3,277,157 | A | 10/1966 | Stewart et al. |
| 4,719,062 | A | 1/1988 | Sundet |
| 5,188,770 | A | 2/1993 | Pennewiss |
| 5,712,359 | A | 1/1998 | Auschra et al. |
| 5,773,505 | A * | 6/1998 | Pennewiss et al. ........... 524/505 |
| 6,409,778 | B1 | 6/2002 | Auschra et al. |
| 6,458,750 | B1 | 10/2002 | Dardin et al. |
| 6,475,964 | B1 * | 11/2002 | Neudoerfl et al. ............ 508/469 |
| 7,179,769 | B2 * | 2/2007 | Sunkara ........................ 508/579 |

FOREIGN PATENT DOCUMENTS

| | | |
|---|---|---|
| DE | 39 30 142 A1 | 3/1991 |
| DE | 40 25 494 A1 | 2/1992 |
| DE | 198 47 423 A1 | 6/1999 |
| DE | 198 38 851 | 3/2000 |
| DE | 100 15 537 A1 | 6/2001 |
| DE | 10 2005 015 931 A1 | 10/2006 |
| EP | 0 418 610 A1 | 3/1991 |
| EP | 0 542 111 A2 | 5/1993 |
| JP | 03-100099 A | 4/1991 |
| JP | 2001-524578 A | 12/2001 |
| JP | 2002-080873 A | 3/2002 |

OTHER PUBLICATIONS

US 5,118,770, 02/1993, Pennewiss et al. (withdrawn).*
International Search Report Issued Feb. 25, 2011 in PCT/EP10/69113 Filed Dec. 8, 2010.
Office Action issued May 7, 2014 in Japanese Patent Application No. 2012-549269 (with English language translation).
Search Report issued Nov. 1, 2010 in German Patent Application No. 10 2010 001 040.5 (with English translation of categories of cited documents).
European Office Action issued Feb. 13, 2015 in connection with corresponding European Patent Application No. 10 788 325.8, filed Dec. 8, 2012.
Lee, Jin Ho., et al. "Surface properties of copolymers of alkyl methacrylates with methoxy (polyethylene oxide) methacrylates and their application as protein-resistant coatings", Biomaterials, vol. 11 (Sep. 1990).

* cited by examiner

*Primary Examiner* — James Goloboy
(74) *Attorney, Agent, or Firm* — Oblon, McClelland, Maier & Neustadt, L.L.P.

(57) ABSTRACT

The invention relates to a (meth)acrylate polymer for improving the viscosity index, which comprises a) from 5 to 60 wt % of repeating units that are derived from (meth)acrylates of formula (I), where R represents hydrogen or methyl and R1 is an alkyl radical having from 1 to 6 carbon atoms, b) from 5 to 80 wt % of repeating units that are derived from (meth)acrylates of formula (II), where R is hydrogen or methyl and R2 is an alkyl radical having from 7 to 30 carbon atoms, and c) from 15 to 90 wt % of repeating units that are derived from (meth)acrylates of formula (III), where R is hydrogen or methyl, n is an integer in the range of 2 to 500 and A is C2-C4 alkylene and R3 is a hydrogen atom or an alkyl radical having from 1 to 4 carbon atoms. The invention further relates to novel lubricating oil compositions, to a method for producing the above-mentioned (meth)acrylate polymers and to the use thereof for improving the viscosity index of lubricating oil compositions that comprise at least one polar base oil.

16 Claims, No Drawings

(METH)ACRYLATE POLYMERS FOR IMPROVING THE VISCOSITY INDEX

The present invention relates to (meth)acrylate polymers for improving the viscosity index. Furthermore, the present invention describes lubricating oil compositions which comprise these (meth)acrylate polymers.

The use of synthetic base oils for lubricating oils is prior art. The advantages of synthetic oils are known per se. For example, viscosimetric properties of oils can be adapted to existing requirements by targeted synthesis of the oils. As early as 1931 there are reports of lubricants (A. W. Neely, R. V. Shankland, F. W. Sullivan, N. N. Vorhees, Ind. Eng. Chem., 1931, 23, page 604) which are based on catalytic polymerization of olefins and exhibit particularly good pour points.

In addition to the polyolefins mentioned, further synthetic oils have in the course of time been used in the lubricants sector. They include ester oils such as, for example, adipates, alkylated aromatics, phosphate esters, siloxanes, and polyalkylene glycols (PAGs).

On account of their high polarity and their incombustibility, PAGs were first employed in water-based hydraulic fluids of military aircraft in World War II (W. H. Millett, Iron Stell Eng., 41, 1948). Later on, the uses of PAGs included their use as lubricants for aircraft engines (B. Rubin, E. M. Glass, SAE Q. Trans., 4, 287, 1950). Of particular advantage in that case were the outstanding low-temperature properties of the PAGs, such as pour points of <−50° C., for example.

Further desirable properties of PAGs include the following: low tendency to form oil residues ("sludge") and soot, residue-free combustion, high compatibility with rubber and elastomers (gasket compatibility), good solution properties. Furthermore, their high polarity gives the PAGs a high affinity for metal surfaces, meaning that the lubricating film remains intact even under high loads.

For these reasons, PAGs have also been used as lubricants for automobile engines. Suitability for this application has been proven by more than 2 million test miles (J. M. Russ, Lubri. Eng., 151, 1946). Owing to economic considerations and low technological requirements, however, the PAGs have not been able to become established here.

In times of decreasing world oil reserves, environmental awareness, and, above all, extended technical requirements profiles for lubricants, there is an increased interest in synthetic base oils.

A decisive criterion for the use of polyalkylene glycols as lubricant base oils is the viscosity. Base oils for lubricants are therefore assigned to ISO VG classes (viscosity class under DIN 51519).

Viscosity index improvers (VIIs) are usually polymeric additives which are capable of reducing the drop in viscosity as oil temperature rises. The polymers that are used in customary, mineral-oil-based lubricating oils for improving the viscosity index belong to different classes.

Included here are olefin copolymers, polyisobutene, styrene-maleic anhydride copolymers, polyisoprene, and polyalkyl acrylates and methacrylates. When PAGs are used as base oil, conventional VIIs cannot be used in general, owing to their low solubility.

Polymers with repeating units which comprise polyalkylene glycol groups are known from the prior art. However, these polymers comprise relatively small fractions of these repeating units.

For example, the documents U.S. Pat. No. 2,892,820 and U.S. Pat. No. 3,277,157 describe PAMA soluble in mineral oil and having side chains based on polyethylene glycol. Through the use of PAMA with polyalkylene glycol side chains, the modified polymers exhibit detergency and dispersing properties, these properties being determinable through reduced paintlike adhesions to cylinders. Similar properties of such polymers are set out in publications EP 418 610 A1 and EP 542 111 A2. Moreover, demulsifiers based on polyalkyl (meth)acrylate copolymers are known from DE 198 03 696 A1.

The use of polyalkyl(meth)acrylate copolymers with polyalkylene glycol side groups for improving the viscosity index of lubricating oil compositions which comprise at least one polar base oil is not described in the publications set out above.

In light of the prior art, then, it was an object of the present invention to provide an additive which leads to an improvement in viscosity index for lubricating oil compositions which comprise at least one polar base oil. This improvement ought to be achieved more particularly for lubricating oil compositions which comprise at least one polyalkylene glycol.

Furthermore, therefore, it was an object of the present invention to provide an additive which leads with very high efficiency to an improvement in the viscosity index. Accordingly, a very small addition of additive ought to be necessary in order to bring about thickening of the polar base oil to a level in line with the standard. In this context, the drop in viscosity on increasing oil temperature ought to be able to be reduced perceptibly even with very small amounts of additive.

A further object of the present invention was to provide an additive which exhibits a good dispersing quality. The additive ought further to exhibit high compatibility with rubber and elastomers (gasket compatibility), so that these components are not attacked by the additive. Similarly, the additive ought not adversely to affect the further desirable properties of the lubricating oil. Thus the additive should not adversely affect the high affinity for metal surfaces of the polar base oil, so that the lubricating film remains intact even under high loads.

Another object of the invention was to provide additives which can be prepared easily and inexpensively, and, in particular, commercially available components ought to be used. The production process here is to be able to be carried out industrially, without the need for new plants or plants of complex structure for that purpose.

An objective of the present invention, moreover, was to provide an additive which brings about a multiplicity of desirable properties in the lubricating oil composition. This allows the number of different additives to be minimized. Accordingly, preferred additives ought more particularly to exhibit dispersing effects.

Furthermore, the additive should not exhibit any adverse effects on the environmental compatibility of the base oil.

Furthermore, the additives ought to have particularly long keeping qualities and ought not to exhibit great degradation during use, thus allowing lubricating oil compositions modified accordingly to be used over a long period of time.

These objects and also others which, though not stated explicitly, are nevertheless readily inferable or realizable from the introductory discussion herein are achieved by means of (meth)acrylate polymers for improving the viscosity index that have all of the features of claim 1. Judicious modifications of the (meth)acrylate polymers of the invention are protected in the dependent subclaims. With regard to the lubricating oil compositions, the particular use of (meth)

acrylate polymers of the invention, and preferred processes for preparing them, claims 9, 12, and 14 provide the achievement of the relevant objects.

The present invention accordingly provides a (meth)acrylate polymer for improving the viscosity index, which is characterized in that the (meth)acrylate polymer
a) comprises 5% to 60% by weight of repeating units derived from (meth)acrylates of the formula (I)

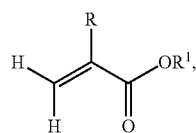

(I)

in which R represents hydrogen or methyl and $R^1$ denotes an alkyl radical having 1 to 6 carbon atoms,
b) comprises 5% to 80% by weight of repeating units derived from (meth)acrylates of the formula (II)

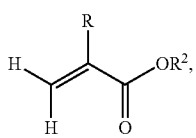

(II)

in which R represents hydrogen or methyl and $R^2$ denotes an alkyl radical having 7 to 30 carbon atoms, and
c) comprises 15% to 90% by weight of repeating units derived from (meth)acrylates of the formula (III)

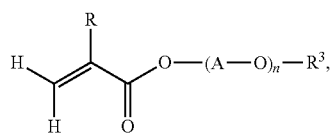

(III)

in which R represents hydrogen or methyl, n stands for a number in the range from 2 to 500 and A stands for $C_2$-$C_4$ alkylene, and $R^3$ denotes a hydrogen atom or an alkyl radical having 1 to 4 carbon atoms.

By this means it is possible in an unforeseeable way to provide an additive which leads with a very high efficiency to an improvement in the viscosity index. Accordingly, a relatively small addition of additive leads to a thickening of the polar base oil to a level in line with the standard. In this context, the drop in viscosity with increasing oil temperature can be lessened perceptibly even with very small amounts of additive.

According to one preferred embodiment of the (meth)acrylate polymer for improving the viscosity index, an additive is provided which exhibits a good dispersing quality. Furthermore, the (meth)acrylate polymer for improving the viscosity index displays a high level of compatibility with rubber and elastomers (gasket compatibility), meaning that these components are not attacked by the additive. Similarly, the additive does not deleteriously influence the other desirable properties of the lubricating oil. For instance the (meth)acrylate polymer for improving the viscosity index does not affect the high affinity of the polar base oil for metal surfaces, and so the lubricating film remains intact even under high loads.

Furthermore, the (meth)acrylate polymers for improving the viscosity index can be prepared easily and inexpensively, and, in particular, commercially available components can be used. Production here may take place industrially, without the need for new plants or plants of complex construction for this purpose.

Furthermore, the (meth)acrylate polymer for improving the viscosity index is able to produce a multiplicity of desirable properties in the lubricating oil composition. As a result, the number of different additives can be minimized. Accordingly, preferred additives may in particular exhibit dispersing effects.

Furthermore, the (meth)acrylate polymer for improving the viscosity index has no adverse effects on the environmental compatibility of the base oil.

Moreover, the (meth)acrylate polymers for improving the viscosity index have particularly long keeping qualities and exhibit a low level of degradation during use, hence allowing lubricating oil compositions thus modified to be used over a long time period.

In accordance with the invention, the (meth)acrylate polymers for improving the viscosity index are provided that comprise 5% to 60% by weight, preferably 15% to 40% by weight, and more preferably 20% to 30% by weight, of repeating units derived from (meth)acrylates of the formula (I)

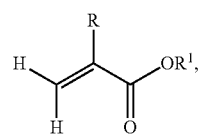

(I)

in which R represents hydrogen or methyl and $R^1$ denotes a having 1 to 6 carbon atoms, which may be linear or branched.

The term "repeating unit" is widely known in the art. The present (meth)acrylate polymers can be obtained preferably via radical polymerization of monomers, with the ATRP, RAFT and NMP processes set out later on being included among radical processes for the purposes of the invention, without any intention thereby to impose any restriction. In these processes, double bonds are opened to form covalent bonds. Accordingly, the repeating unit is a product of the monomers employed. For determining the weight fraction it is possible customarily to disregard end groups or start groups. Accordingly, the weight fraction of the respective repeating units which these polymers contain is given by the weight fractions of corresponding monomers that are used for preparing the polymers.

The expression "(meth)acrylates" encompasses methacrylates and acrylates and also mixtures thereof. These monomers are widely known.

Examples of monomers of formula (I) include (meth)acrylates which derive from saturated alcohols, such as methyl (meth)acrylate, ethyl(meth)acrylate, n-propyl(meth)acrylate, isopropyl(meth)acrylate, n-butyl(meth)acrylate, tert-butyl (meth)acrylate, and pentyl(meth)acrylate, hexyl(meth)acrylate; cycloalkyl(meth)acrylates, such as cyclopentyl(meth) acrylate, cyclohexyl(meth)acrylate. Of the monomers stated, methyl methacrylate is particularly preferred.

Furthermore (meth)acrylate polymers of the invention for improving the viscosity index comprise 5% to 80% by weight, preferably 15% to 70% by weight, and more preferably 20% to 60% by weight of repeating units derived from (meth)acrylates of the formula (II)

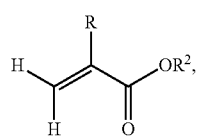

(II)

in which R represents hydrogen or methyl and $R^2$ denotes an alkyl radical having 7 to 30 carbon atoms, which may be linear or branched.

Examples of monomers of formula (II) include the following: (meth)acrylates which derive from saturated alcohol, such as 2-ethylhexyl(meth)acrylate, heptyl(meth)acrylate, 2-tert-butylheptyl(meth)acrylate, octyl(meth)acrylate, 3-isopropylheptyl(meth)acrylate, nonyl(meth)acrylate, decyl(meth)acrylate, undecyl(meth)acrylate, 5-methylundecyl(meth)acrylate, dodecyl(meth)acrylate, 2-methyldodecyl(meth)acrylate, tridecyl(meth)acrylate, 5-methyltridecyl(meth)acrylate, tetradecyl(meth)acrylate, pentadecyl(meth)acrylate, hexadecyl(meth)acrylate, 2-methylhexadecyl(meth)acrylate, heptadecyl(meth)acrylate, 5-isopropylheptadecyl(meth)acrylate, 4-tert-butyloctadecyl(meth)acrylate, 5-ethyloctadecyl(meth)acrylate, 3-isopropyloctadecyl(meth)acrylate, octadecyl(meth)acrylate, nonadecyl(meth)acrylate, eicosyl(meth)acrylate, cetyleicosyl(meth)acrylate, stearyleicosyl(meth)acrylate, docosyl(meth)acrylate and/or eicosyltetratriacontyl(meth)acrylate; cycloalkyl(meth)acrylates, such as 3-vinylcyclohexyl(meth)acrylate, bornyl(meth)acrylate, 2,4,5-tri-tert-butyl-3-vinylcyclohexyl(meth)acrylate, 2,3,4,5-tetra-tert-butylcyclohexyl(meth)acrylate.

The (meth)acrylates with a long-chain alcohol residue can be obtained, for example, by reacting (meth)acrylates and/or (meth)acrylic acid with long-chain fatty alcohols, the product generally comprising a mixture of (meth)acrylates with alcohol residues of different chain lengths. These fatty alcohols include, among others, Oxo Alcohol® 7911, Oxo Alcohol® 7900, Oxo Alcohol® 1100; Alfol® 610, Alfol® 810, Lial® 125 and Nafol® products (Sasol); Alphanol® 79 (ICI); Epal® 610 and Epal® 810 (Afton); Linevol® 79, Linevol® 911, and Neodol® 25E (Shell); Dehydad®, Hydrenol®- and Lorol®-type (Cognis); Acropol® 35 and Exxal® 10 (Exxon Chemicals); Kalcol® 2465 (Kao Chemicals).

The fraction of repeating units in the (meth)acrylate polymer that are derived from (meth)acrylates having 7 to 15 carbon atoms in the alcohol residue may amount preferably to 5% to 80% by weight, more preferably 15% to 70% by weight, and very preferably 20% to 60% by weight, based on the weight of the monomers used for preparing the (meth)acrylate polymer. Additionally preferred are (meth)acrylate polymers which have 0.5% to 60% by weight, more preferably 1% to 20% by weight, of repeating units derived from (meth)acrylates having 16 to 30 carbon atoms.

According to one preferred embodiment of the present invention, mixtures of monomers of the formula (II) may also be used, in which case the mixture preferably comprises at least one (meth)acrylate having 7 to 15 carbon atoms in the alcohol residue and at least one (meth)acrylate having 16 to 30 carbon atoms in the alcohol residue. The weight ratio of (meth)acrylates having 7 to 15 carbon atoms in the alcohol residue to (meth)acrylates having 16 to 30 carbon atoms in the alcohol residue is preferably in the range from 10:1 to 1:10, more preferably in the range from 5:1 to 1.5:1.

Furthermore, (meth)acrylate polymers of the invention for improving the viscosity index comprise 15% to 90% by weight, preferably 25% to 70% by weight, and more preferably 30% to 60% by weight of repeating units derived from (meth)acrylates of the formula (III):

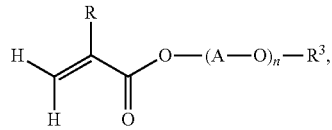

(III)

in which n indicates the number of repeating units and in general stands for a number in the range from 2 to 150, more particularly in the range from 3 to 50, and more preferably in the range from 4 to 20, A stands for $C_2$-$C_4$ alkylene such as 1,2-ethanediyl, 1,3-propanediyl, 1,2-propanediyl, 1,2-butanediyl or 1,4-butanediyl; R stands for hydrogen or methyl, and $R^3$ stands for hydrogen or alkyl having 1 to 4 C atoms, and especially methyl or ethyl.

The monomers derived from (meth)acrylates of the formula (III) are also referred to in the context of the present invention as polyalkylene glycol mono(meth)acrylates.

Mono(meth)acrylic acid esters of poly-$C_2$-$C_4$ alkylene glycol that can be used with particular preference are notable for the fact that at least 50% by weight, preferably at least 70% by weight, more particularly at least 90% by weight, and especially all of the repeating units A-O in formula (III) are derived from ethylene glycol or from ethylene oxide. Accordingly, preferably at least 50% by weight, more particularly at least 70% by weight, very preferably at least 90% by weight, and especially all, of the units A-O in formula (III) stand for $CH_2$—$CH_2$—O. According to a further preferred embodiment of the present invention, at least 50% by weight, preferably at least 70% by weight, more particularly at least 90% by weight, and especially all of the repeating units A-O in formula (III) may be derived from propylene glycol or propylene oxide.

The preferred polyalkylene glycol mono(meth)acrylates include more particularly alkoxypolyalkylene glycol mono(meth)acrylates, which are distinguished by an alkyl group as radical $R^4$ in above formula (III). Particular preference in this context is given more particularly to methoxypolyethylene glycol mono(meth)acrylates, also designated MPEG (meth)acrylates.

The preparation of monomers of formula (III) is set out inter alia in WO 2006/024538, filed Sep. 2, 2005 at the European Patent Office with the application number PCT/EP2005/009466; and WO 2005/000929, filed May 20, 2004 at the United States Patent Office (USPTO) with the application number PCT/US2004/015898 for purposes of disclosure, reference is made to these publications, and the therein-described polyalkylene glycol mono(meth)acrylates and processes for preparing them are incorporated into the present application. Accordingly, polyalkylene glycol mono(meth)acrylates having a hydroxyl group may be obtained by reacting (meth)acrylic acid with epoxides. Furthermore, polyalkylene glycol mono(meth)acrylates may be obtained by transesterifying alkyl(meth)acrylates with alkoxypolyalkylene glycols, more particularly methoxypolyalkylene glycols.

The weight-average molecular weight of the polyalkylene glycol mono(meth)acrylate is situated preferably in the range from 200 to 6000 g/mol, more preferably in the 250 to 1000 g/mol range, as measured by GPC.

The preferred (meth)acrylates of formula (III) include, among others, 2-[2-(2-ethoxyethoxy)ethoxy]ethyl methacrylate, 2-[2-(2-methoxyethoxy)ethoxy]ethyl acrylate, 2-[2-(2-ethoxyethoxy)ethoxy]ethyl acrylate, 2-(2-ethoxyethoxy)ethyl methacrylate, 2-(2-butoxyethoxy)ethyl methacrylate, methyldipropylene glycol methacrylate, methyltripropylene glycol methacrylate, methyltripropylene glycol acrylate, methyldipropylene glycol acrylate, 2-[2-(2-methoxyethoxy)ethoxy]ethyl methacrylate. Of particular interest more particularly is butyldiglycol methacrylate with the CAS No. 7328-22-5, which is available commercially from Evonik Röhm GmbH under the trade name VISIOMER® BDGMA. Particularly preferred is ethyltriglycol methacrylate with the CAS No. 39670-09-2, which can be acquired commercially from Evonik Röhm GmbH under the trade name VISIOMER® ETMA.

Polyalkylene glycol mono(meth)acrylates for preferred use are additionally methoxypolyethylene glycol monomethacrylates with the CAS No. 26 915-72-0. These methoxypolyethylene glycol monomethacrylates preferably have a number-average molecular weight in the range from 350 to 5500, and so n in formula (III) above is situated preferably in the range from 6 to 120. These monomers can be acquired commercially more particularly under the trade names Plex® 6850-0, Plex® 6969-0, Plex® 6968-0 and Plex® 6965-0 or VISIOMER® MPEG 750 MA W, VISIOMER® MPEG 1005 MA W, VISIOMER® MPEG 2005 MA W, and VISIOMER® MPEG 5005 MA W from Evonik Röhm GmbH.

The (meth)acrylate polymers of the invention may comprise further monomers which are copolymerizable with the aforementioned (meth)acrylates of the formulae (I) to (III). These further monomers include, among others, aryl(meth)acrylates, such as benzyl methacrylate or phenyl methacrylate, where the aryl radicals may in each case be unsubstituted or substituted up to four times;

styrene, substituted styrenes having an alkyl substituent in the side chain, such as, for example, □-methylstyrene and □-ethylstyrene, substituted styrenes having an alkyl substituent on the ring, such as vinyltoluene and p-methylstyrene, halogenated styrenes, such as, for example, monochlorostyrenes, dichlorostyrenes, tribromostyrenes, and tetrabromostyrenes;

maleic acid and maleic acid derivatives, such as, for example, maleic monoesters, maleic diesters, maleic anhydride, methylmaleic anhydride, maleimide, methylmaleimide;

itaconic acid and itaconic acid derivatives, such as, for example, itaconic monoesters, itaconic diesters, and itaconic anhydride;

fumaric acid and fumaric acid derivatives such as, for example, fumaric monoesters, fumaric diesters, and fumaric anhydride.

In accordance with one particular embodiment it is possible more particularly to use dispersing monomers, which differ from monomers of formula (III).

Dispersing monomers have long been used in lubricating oils for functionalizing polymeric additives, and are therefore known to the skilled person (cf. R. M. Mortier, S. T. Orszulik (eds.): "Chemistry and Technology of Lubricants", Blackie Academic & Professional, London, $2^{nd}$ ed. 1997). Judicially it is possible for heterocyclic vinyl compounds, in particular, and/or ethylenically unsaturated, polar ester compounds or amide compounds of the formula (IV)

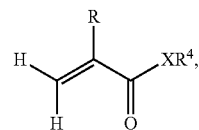

in which R represents hydrogen or methyl, X oxygen, sulfur or an amino group of the formula —NH— or —$NR^a$—, in which $R^a$ stands for an alkyl radical having 1 to 10, preferably 1 to 4, carbon atoms, $R^4$ represents a radical which comprises 2 to 50, more particularly 2 to 30, preferably 2 to 20 carbon atoms and has at least one, preferably at least two heteroatoms, to be used as dispersing monomers.

Examples of dispersing monomers of the formula (IV) include aminoalkyl(meth)acrylates, aminoalkyl(meth)acrylamides, hydroxylalkyl(meth)acrylates, heterocyclic(meth)acrylates and/or carbonyl-containing (meth)acrylates.

The hydroxyalkyl(meth)acrylates include, among others, 2-hydroxypropyl(meth)acrylate,
3,4-dihydroxybutyl(meth)acrylate,
2-hydroxyethyl(meth)acrylate,
3-hydroxypropyl(meth)acrylate,
2,5-dimethyl-1,6-hexanediol(meth)acrylate, and
1,10-decanediol(meth)acrylate.

Carbonyl-containing (meth)acrylates comprise, for example,
2-carboxyethyl(meth)acrylate,
carboxymethyl(meth)acrylate,
N-(methacryloyloxy)formamide,
acetonyl(meth)acrylate,
Mono-2-(meth)acryloyloxyethyl succinate,
N-(meth)acryloylmorpholine,
N-(meth)acryloyl-2-pyrrolidinone,
N-(2-(meth)acryloyloxyethyl)-2-pyrrolidinone,
N-(3-(meth)acryloyloxypropyl)-2-pyrrolidinone,
N-(2-(meth)acryloyloxypentadecyl)-2-pyrrolidinone,
N-(3-(meth)acryloyloxyheptadecyl)-2-pyrrolidinone, and
N-(2-(meth)acryloyloxyethyl)ethylenurea.
2-Acetoacetoxyethyl(meth)acrylate The heterocyclic(meth)acrylates include, among others,
2-(1-imidazolyl)ethyl(meth)acrylate,
oxazolidinylethyl(meth)acrylate,
2-(4-morpholinyl)ethyl(meth)acrylate
1-(2-methacryloyloxyethyl)-2-pyrrolidone,
N-methacryloylmorpholine,
N-methacryloyl-2-pyrrolidinone,
N-(2-methacryloyloxyethyl)-2-pyrrolidinone,
N-(3-methacryloyloxypropyl)-2-pyrrolidinone.

The aminoalkyl(meth)acrylates include more particularly
N,N-dimethylaminoethyl(meth)acrylate,
N,N-dimethylaminopropyl(meth)acrylate,
N,N-diethylaminopentyl(meth)acrylate,
N,N-dibutylaminohexadecyl(meth)acrylate.

Additionally it is possible to use aminoalkyl(meth)acrylamides as dispersing monomers, such as N,N-dimethylaminopropyl(meth)acrylamide.

Furthermore, it is possible to use phosphorus-, boron- and/or silicon-containing (meth)acrylates as dispersing monomers, such as
2-(dimethylphosphato)propyl(meth)acrylate,
2-(ethylenephosphito)propyl(meth)acrylate,
dimethylphosphinomethyl(meth)acrylate,
dimethylphosphonoethyl(meth)acrylate,
diethyl(meth)acryloylphosphonate, dipropyl(meth)acryloylphosphate,
2-(dibutylphosphono)ethyl(meth)acrylate,
2,3-butylene(meth)acryloylethylborate,
methyldiethoxy(meth)acryloylethoxysilane,
diethylphosphatoethyl(meth)acrylate.

The preferred heterocyclic vinyl compounds include, among others, 2-vinylpyridine, 3-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole,
4-vinylcarbazole, 1-vinylimidazole, N-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, and vinyloxazoles and hydrogenated vinyloxazoles.

The particularly preferred dispersing monomers include more particularly ethylenically unsaturated compounds which comprise at least one nitrogen atom, these compounds being selected with particular preference from the aforementioned heterocyclic vinyl compounds and/or aminoalkyl(meth)acrylates, aminoalkyl(meth)acrylamides and/or heterocyclic(meth)acrylates.

The aforementioned ethylenically unsaturated monomers can be used individually or as mixtures. It is possible, furthermore, to vary the monomer composition during the polymerization of the main chain, in order to obtain defined structures, such as block copolymers or graft polymers, for example.

Among the (meth)acrylate polymers of particular interest are those which preferably have a weight-average molecular weight $M_w$ in the range from 5000 to 1 000 000 g/mol, more preferably 10 000 to 200 000 g/mol, and very preferably 40 000 to 100 000 g/mol.

The number-average molecular weight $M_n$ of the (meth)acrylate polymer may be situated preferably in the range from 5000 to 800 000 g/mol, more preferably 8000 to 200 000 g/mol, and very preferably 30 000 to 100 000 g/mol.

Judicious, furthermore, are (meth)acrylate polymers whose polydispersity index $M_w/M_n$ is in the range from 1 to 5, more preferably in the range from 2.5 to 4.5. The number-average and weight-average molecular weights can be determined by known methods, as for example gel permeation chromatography (GPC). This method is described comprehensively in WO 2007/025837, filed Aug. 4, 2006 at the European Patent Office with the application number PCT/EP2006/065060, and in WO 2007/03238, filed Apr. 7, 2006 at the European Patent Office with the application number PCT/EP2007/003213, therein-expounded methods for determining the molecular weight being incorporated for purposes of disclosure into this application.

The comb polymers of the invention can be prepared in a variety of ways. One preferred process is the conventional radical copolymerization of the stated monomers.

Accordingly, these polymers may be obtained more particularly by radical polymerization, and also related processes of controlled radical polymerization, such as, for example, ATRP (Atom Transfer Radical Polymerization), NMP (Nitroxide-mediated Polymerization) or RAFT (Reversible Addition Fragmentation Chain Transfer).

Ullmanns's Encyclopedia of Industrial Chemistry, Sixth Edition, is among the sources which describe the customary free radical polymerization. For this purpose in general a polymerization initiator and also, optionally, a chain transfer agent are used.

The initiators which can be used include, among others, the azo initiators widely known within the art, such as AIBN and 1,1-azobiscyclohexanecarbonitrile, and also peroxy compounds, such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropyl carbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl)peroxydicarbonate, mixtures of two or more of the aforementioned compounds with one another, and mixtures of the aforementioned compounds with unspecified compounds which are likewise able to form radicals. Especially suitable as chain transfer agents are oil-soluble mercaptans such as, for example, n-dodecyl mercaptan or 2-mercaptoethanol or else chain transfer agents from the class of the terpenes, such as terpinolene, for example.

The ATRP process is known per se. It is assumed that this process is a "living" radical polymerization, without any intention to impose a restriction by the description of the mechanism. In this process a transition metal compound is reacted with a compound which has a transferable atomic group. In the course of the reaction, the transferable atomic group is transferred to the transition metal compound, thereby oxidizing the metal. In this reaction a radical is formed and undergoes addition to ethylenic groups. The transfer of the atomic group to the transition metal compound, however, is reversible, and so the atomic group is transferred back to the growing polymer chain, thus forming a controlled polymerization system. Accordingly, the structure of the polymer, the molecular weight, and the molecular weight distribution can be controlled.

This reaction regime is described for example by J-S. Wang, et al., J. Am. Chem. Soc., vol. 117, pp. 5614-5615 (1995), and by Matyjaszewski, Macromolecules, vol. 28, pp. 7901-7910 (1995). Furthermore, patent applications WO 96/30421, WO 97/47661, WO 97/18247, WO 98/40415, and WO 99/10387 disclose variants of the above-elucidated ATRP.

The polymers of the invention may, furthermore, also be obtained by RAFT methods, for example. This process is set out comprehensively in WO 98/01478 and WO 2004/083169, for example.

The polymerization can be carried out under atmospheric, subatmospheric or superatmospheric pressure. The polymerization temperature as well is not critical. Generally speaking, however, it is in the range of −20°-200° C., preferably 50°-150° C., and more preferably 80° C.-130° C.

The polymerization can be carried out with or without solvent. The concept of the solvent is to be understood broadly here. The solvent is selected according to the polarity of the monomers used, with ester oils being especially preferred. The ester oils include more particularly ester compounds derived from carboxylic acids and/or phosphoric acids.

The ester oils derived from phosphorus compounds include, in particular, alkylaryl phosphate esters; trialkyl phosphates, such as, for example, tributyl phosphate or tri-2-ethylhexyl phosphate; triaryl phosphates, such as, for example, mixed isopropylphenyl phosphates, mixed tert-butylphenyl phosphates, trixylenyl phosphate, or tricresyl phosphate. Other classes of organic phosphorus compounds that can be used as solvents include phosphonates and phosphinates, which may comprise alkyl and/or aryl substitutents.

Dialkyl phosphonates, as for example di-2-ethylhexyl phosphonate, and alkyl phosphinates, as for example di-2-ethylhexyl phosphinate, can be used as a base oil. Preferred alkyl groups comprise linear or branched carbon chains with 1 to 10 carbon atoms. Concerning the aryl groups, radicals having 6 to 10 carbon atoms are preferred, which comprise 6 to 10 carbon atoms, and these atoms may be substituted by alkyl groups.

It is also possible to use solvents based on carboxylic esters. Customarily, these carboxylic esters are reaction products of alcohols, such as monohydric or polyhydric alcohols, for example, and carboxylic acids, such as monobasic or polybasic carboxylic acids, for example. In this context it is also possible to use partial carboxylic esters.

Carboxylic esters may have a carboxylic ester group with the formula R—COO—R, in which R independently is a group having 1 to 40 carbon atoms. Preferred ester compounds comprise at least two ester groups. These compounds may be based on polycarboxylic acids having at least two acid groups and/or on polyols having at least two hydroxyl groups.

Preferred polycarboxylic acid radicals may comprise 2 to 40, preferably 4 to 24, more preferably 4 to 12 carbon atoms. Judicious polycarboxylic esters are, for example, esters of adipic, azelaic, sebacic, phthalic and/or dodecanoic acids. The alcohol components of the polycarboxylic esters comprise preferably 1 to 20, more preferably 2 to 10 carbon atoms.

Examples of judicious alcohols for preparing the aforementioned esters are methanol, ethanol, propanol, butanol, pentanol, hexanol, heptanol, octanol, nonanol, decanol, undecanol, and dodecanol.

In accordance with one preferred embodiment, compounds are used which are derived from polycarboxylic acids and alcohols having precisely one hydroxyl group. Examples of these compounds are given in sources including Ullmanns Encyclopädie der Technischen Chemie, $3^{rd}$ edn, vol. 15, pages 287-292, Urban & Schwarzenber (1964)).

Judicious polyols for preparing the ester compounds having at least two ester groups customarily contain 2 to 40, preferably 4 to 22, carbon atoms. Examples are neopentyl glycol, diethylene glycol, dipropylene glycol, 2,2-dimethyl-3-hydroxypropyl 2',2'-dimethyl-3'-hydroxypropionate, glycerol, trimethylolethane, trimethanolpropane, trimethylolnonane, ditrimethylolpropane, pentaerythritol, sorbitol, mannitol, and dipentaerythritol. The carboxylic acid component of the polyester may contain 1 to 40, preferably 2 to 24, carbon atoms. Examples are linear or branched saturated carboxylic acids, such as, for example, formic acid, acetic acid, propionic acid, octanoic acid, caproic acid, enanthic acid, caprylic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachidic acid, behenic acid, isomyristic acid, isopalmitic acid, isostearic acid, 2,2-dimethylbutanoic acid, 2,2-dimethylpentanoic acid, 2,2-dimethyloctanoic acid, 2-ethyl-2,3,3-trimethylbutanoic acid, 2,2,3,4-tetramethylpentanoic acid, 2,5,5-trimethyl-2-tert-butylhexanoic acid, 2,3,3-trimethyl-2-ethylbutanoic acid, 2,3-dimethyl-2-isopropylbutanoic acid, 2-ethylhexanoic acid, 3,5,5-trimethylhexanoic acid; linear or branched unsaturated carboxylic acids, such as, for example, linolic acid, linolenic acid, 9-octadecenoic acid, undecenoic acid, elaidic acid, eicosapentaenoic acid, erucic acid, brassidic acid, and oleic acid. These acids can be obtained commercially in a multiplicity of purities. Fatty acid mixtures, such as tall oil fatty acids, for example, may likewise be used.

Particularly preferred ester compounds having at least two ester groups include diisononyl adipate, neopentylglycol tallate, neopentylglycol dioleate, propylene glycol tallate, propylene glycol dioleate, diethylene glycol tallate, and diethylene glycol dioleate. By tallates here are meant esters derived from tall oil fatty acid mixtures.

Many of these compounds can be obtained commercially from BASF under the trade name ®Plastomoll DNA, from Inolex Chemical Co. under the trade name ®Lexolube 2G-214, from Cognis Corp. under the trade name ®ProEco 2965, from Uniqema Corp. under the trade name ®Priolube 1430 and ®Priolube 1446, and from Georgia Pacific under the trade name ®Xtolube 1301 and ®Xtolube 1320.

The monomers to be used for preparing the polymers of the invention in a radical copolymerization are generally available commercially.

The (meth)acrylate polymers of the invention are used in particular for improving the viscosity index of lubricating oil formulations based more particularly on polar base oils. Polar base oils customarily comprise compounds having polar groups, more particularly ester groups and/or ether groups. These polar base oils include, among others, organic esters, examples being diesters and polyesters of carboxylic acids, such as adipates, for example, phosphate esters, polyalkylene glycols, polyethers, and silicone oils.

The preferred polar base oils include more particularly the aforementioned ester oils which preferably comprise phosphoric esters and/or carboxylic esters. It is also possible to use ester oils obtainable by polymerization of (meth)acrylates. These include, among others, the synthesis oils set out in EP-0 471 266 A1; the (meth)acrylate-based oils set out in EP-0 471 266 A1, filed at the European Patent Office on Aug. 5, 1991 with the application number EP 91113123.3, are incorporated for purposes of disclosure into the present application by reference. These oils are available commercially under the name ®Viscobase from Evonik RohMax GmbH.

Particularly surprisingly, the present (meth)acrylate polymers can be used for improving the viscosity behavior of polyalkylene glycols. Polyalkylene glycols are known within the art, and these polyethers can generally be obtained by anionic ring-opening polymerization of alkylene oxides (ethylene oxide, propylene oxide, butylene oxide, etc.) with an initiator such as, for example, an alcohol (Ullmann Encyclopedia of Industrial Chemistry, 5th edn., VCH, ISBN 3-527-20100-9). Catalysts used for this anionic polymerization of the alkylene oxides are generally alkali metal hydroxides such as potassium or sodium hydroxide.

The use and requirements of these polyalkylene glycols as base oils for formulating lubricants is described for example in the FDA Regulations 21 CFR 178.3910 (Surface lubricants used in manufacture of metallic articles) or 21 CFR 173.340, 21 CFR 178.3570 (lubricants with incidental food contact). Polyalkylene glycol base oils are characterized via their viscosity, their average molar mass and molar-mass distribution, and the ratio of the incorporated alkylene oxide monomers.

For the application of polyalkylene glycols as lubricant base oils, the viscosity is a decisive criterion. Accordingly, base oils for lubricants are assigned to ISO-VG classes (viscosity class as per DIN 51519).

In accordance with the invention it is possible to use polyalkylene homopolymers, more particularly polyethylene glycol, polypropylene glycol and/or polybutylene glycol, or polyalkylene copolymers, more particularly copolymers containing ethylene glycol, propylene glycol, and/or butylene glycol units. In this context it is possible to use not only random copolymers but also block copolymers.

The number-average molecular weight of preferred polyalkylene glycols is situated preferably in the range from 200 to 4000 g/mol, more preferably in the range from 350 to 2000 g/mol. These figures may be determined, for example, by GPC or, in the case of low molecular weight, via vapor pressure osmosis.

Further details of polyalkylene glycols which can be used especially in lubricating oil formulations are described more particularly in Rudnik, L. R., Shubkin, R. L., Synthetic Lubricants and High-Performance Functional Fluids, $2^{nd}$ edn. 1999, chapter 6, and in Mang, Th., Dresel W., Lubricants and Lubrication, $2^{nd}$ edn. 2007, section 5.3, this publication being incorporated by reference into this application for purposes of disclosure.

As lubricating oil (base oil) it is possible more particularly to use oils having a viscosity in the range from 3 $mm^2/s$ to 400 $mm^2/s$, with particular preference 5 $mm^2/s$ to 350 $mm^2/s$, as measured at 40° C. in accordance with ASTM 445.

These base oils can also be used as mixtures and are widely available commercially. For instance, the aforementioned polyalkylene glycols are obtainable in particular from Clariant, from Dow under the name ®Synalox, and from Klüber Lubrication under the name ®Klübersynth.

The concentration of the (meth)acrylate polymer in the lubricating oil composition is preferably in the range from 0.1% to 40% by weight, more preferably in the range from 1% to 30% by weight, very preferably in the range from 2% to 25% by weight, and especially preferably in the range of 5%-20% by weight, based on the total weight of the composition.

Besides the aforementioned components, a lubricating oil composition may comprise further additives and adjuvants. These additives include, among others, DI additives (dispersants, detergents, defoamers, corrosion inhibitors, antioxidants, antiwear and extreme-pressure additives, friction modifiers) and/or dyes.

Preferred lubricating oil compositions have a viscosity $KV_{40}$ as measured in accordance with ASTM D 445 at 40° C. in the range from 10 to 500 $mm^2/s$, more preferably in the range from 22 to 200 $mm^2/s$. The kinematic viscosity measured at 100° C., $KV_{100}$, is preferably at least 6.5 $mm^2/s$, more preferably at least 7.5 $mm^2/s$, and very preferably at least 8.0 $mm^2/s$.

In accordance with one particular aspect of the present invention, preferred lubricating oil compositions have a viscosity index as determined in accordance with ASTM D 2270 in the range from 100 to 400, more preferably in the range from 150 to 350, and very preferably in the range from 175 to 275.

The present lubricating oil compositions can be used especially as transmission oil, engine oil or hydraulic oil. Surprising advantages can be achieved more particularly when using the present lubricants in manual, automated manual, double clutch or direct shift (DSG) transmissions, automatic and continuous variable transmission (CVC) systems. In addition the present lubricants can be used more particularly in transfer case transmissions and in axle and differential transmission systems.

In the text below, the present invention will be illustrated using inventive and comparative examples, without any intention thereby to impose any restriction. The figures in percent relate to the weight, unless otherwise specified.

Abbreviations

DPMA=Dodecyl-pentadecyl methacrylate (prepared from ®Neodol 25 E from Shell)

LIMA=Dodecyl-pentadecyl methacrylate (prepared from ®LIAL 125 from Sasol)

MMA=Methyl methacrylate

ETGMA=2-[2-(2-Ethoxyethoxy)ethoxy]ethyl methacrylate

NVP=N-vinyl-2-pyrrolidone

MAA=Methacrylic acid

DMAPMA=3-Dimethylaminopropyl methacrylate

DMAEMA=2-Dimethylaminoethyl methacrylate

MOEMA=2-(4-Morpholinyl)ethyl methacrylate

OEMA=2-(3-Oxazolidinyl)ethyl methacrylate

Procedure for the Carbon Black Spotting Test:

The dispersing effect of the resultant polymers in the corresponding oil was determined by means of a spotting test, of the kind described for example by A. Schilling in "Les Huiles pour Moteurs et le Graissage des Moteurs", vol. 1, 1962, page 89 f. in a somewhat modified form. For this purpose, 1.5 g of carbon black (lamp black; Degussa Spezialschwarz 4), 50 g of formulation, and then 275 steel balls (d=2 mm) were placed in a 150 ml Teflon beaker. The prepared samples were shaken for 15 minutes using a Red Devil 5400 paint mixer, then filtered through a rapid sieve (280 µm). After that, 20 µl of each dispersion solution are applied as a spot to filter paper ($589^2$, white ribbon, ashless, d=90 mm). After 1 hour of storage in a drying oven at 80° C., the samples were evaluated. For the purpose of evaluation, the diameter of the carbon black spot d1 and the diameter of its surrounding oil spot d2 were measured and expressed as a proportion to one another, in % (evaluation=d1/d2*100%). The higher the evaluation, i.e., the lower the diameter of the surrounding oil spot in relation to the carbon black spot, the better the dispersing effect. The procedure specified was carried out twice.

The overall evaluation of the spotting test is produced as the sum of two individual tests. Products with poor carbon black dispersing therefore produce lower values than those products with good carbon black dispersing effect.

EXAMPLES 1 TO 10

A 2 L reaction flask of an apparatus with Saber stirrer, condenser, temperature regulator with PT100, feed pump, and $N_2$ feed line was charged with 49.3 g of a monomer mixture, whose composition is set out in table 1, and 444.0 g of ®Plastomoll DNA (diisononyl adipate; available from BASF). The apparatus was rendered inert and heated to 100° C. In addition, a monomer/initiator mixture was prepared, comprising 506.7 g of a monomer mixture, whose composition is set out in table 1, and 9.4 g of tert-butyl per-2-ethylhexanoate. When the mixture in the reaction flask had reached a temperature of 100° C., 1.68 g of tert-butyl per-2-ethylhexanoate were added, and at the same time the feed of the monomer/initiator mixture was commenced by pump. It was added at a uniform rate over a period of 210 minutes at 100° C. 2 hours after the end of the feed, a further 1.1 g of tert-butyl per-2-ethylhexanoate were added and stirring was continued at 100° C. for 2 hours more. This gave a clear solution with a strength of 55.6%. The weight-average molar mass of the polymer as obtained by means of GPC is likewise given in table 1.

TABLE 1

| | LIMA [%] | MMA [%] | ETGMA [%] | DMAPMA [%] | DMAEMA [%] | MOEMA [%] | OEMA [%] | Mw (GPC) |
|---|---|---|---|---|---|---|---|---|
| Example 1 | 45.0 | 25.0 | 30.0 | — | — | — | — | 69 800 |
| Example 2 | 35.0 | 25.0 | 40.0 | — | — | — | — | 77 500 |
| Example 3 | 15.0 | 25.0 | 60.0 | — | — | — | — | 77 800 |
| Example 4 | 41.5 | 25.0 | 30.0 | 3.5 | — | — | — | 69 800 |
| Example 5 | 41.5 | 25.0 | 30.0 | — | 3.5 | — | — | 61 200 |
| Example 6 | 41.5 | 25.0 | 30.0 | — | — | 3.5 | — | 60 400 |
| Example 7 | 41.5 | 25.0 | 30.0 | — | — | — | 3.5 | 78 200 |
| Example 8 | 41.5 | 25.0 | 33.5 | — | — | — | — | 79 000 |
| Example 9 | 35.0 | 5.0 | 60.0 | — | — | — | — | 83 900 |
| Example 10 | 65.0 | 5.0 | 30.0 | — | — | — | — | 67 000 |

EXAMPLE 11 AND COMPARATIVE EXAMPLES 1 TO 4

A 2 L reaction flask of an apparatus with Saber stirrer, condenser, temperature regulator with PT100, feed pump, and $N_2$ feed line was charged with 49.3 g of a monomer mixture, whose composition is set out in table 2, and 444.0 g of Plastomoll DNA. The apparatus was rendered inert and heated to 100° C. In addition, a monomer/initiator mixture was prepared, comprising 506.7 g of a monomer mixture, whose composition is set out in table 2, and 9.4 g of tert-butyl per-2-ethylhexanoate. When the mixture in the reaction flask had reached a temperature of 100° C., 1.68 g of tert-butyl per-2-ethylhexanoate were added, and at the same time the feed of the monomer/initiator mixture was commenced by pump. It was added at a uniform rate over a period of 210 minutes at 100° C. 2 hours after the end of the feed, a further 1.1 g of tert-butyl per-2-ethylhexanoate were added and stirring was continued at 100° C. for 2 hours more. This gave a clear solution with a strength of 55.6%. This solution was admixed with 17.8 g of NVP and 14.2 g of Plastomoll DNA, and heated to 130° C. When the temperature was reached, 1.4 g of tert-butyl perbenzoate were added. 1, 2, and 3 hours after that, a further 0.72 g of tert-butyl perbenzoate was added. After the final addition of initiator, stirring was continued at 130° C. for 2 hours. This gave a clear solution with a strength of 55.6%. The viscosity obtained by the Brookfield method (BV100) is likewise given in table 2.

TABLE 2

| | DPMA [%] | MMA [%] | ETGMA [%] | NVP [%] | MAA | Styrene | BV 100 [mm²/s] |
|---|---|---|---|---|---|---|---|
| Example 11 | 53.3 | 24.2 | 19.4 | 3.1 | — | — | 702 |
| Comparative example 1 | 72.7 | 24.2 | — | 3.1 | — | — | 520 |
| Comparative example 2 | 69.8 | 24.2 | — | 3.1 | 2.9 | — | 1454 |
| Comparative example 3 | 67.8 | 24.2 | — | 3.1 | 4.9 | — | 5940 |
| Comparative example 4 | 63.0 | 24.2 | — | 3.1 | — | 9.7 | 865 |

Use Examples

The improvement of the viscosity index by the polymers described was investigated in polyalkylene glycols, using a low-viscosity polyalkylene oil (PAG 1: UCON 50-HB-55 from Dow Chemicals) and a high-viscosity polyalkylene oil (PAG 2: SINALOX 50-S220 from Shell). The results obtained are set out in tables 3 and 4. The formulations were adjusted to a viscosity of approximately 8 mm²/s at 100° C. (ASTM D445). Determinations were made of the typical formulation variables of KV40 (ASTM D445) and viscosity index VI (ASTM 2270); the values obtained can be taken from table 2.

TABLE 3

Additization of PAG 1

| Polymer from | Amount of polymer added in % | KV100 [mm²/s] | KV40 [mm²/s] | VI |
|---|---|---|---|---|
| — | — | 2.338 | 8.318 | 92 |
| Example 1 | 21.1 | 8.075 | 30.81 | 254 |
| Example 2 | 20.0 | 7.993 | 31.09 | 247 |
| Example 3 | 20.0 | 7.916 | 29.58 | 285 |
| Example 4 | 20.3 | 8.118 | 31.24 | 252 |
| Example 5 | 22.0 | 8.027 | 31.21 | 248 |
| Example 6 | 22.4 | 7.990 | 31.07 | 247 |
| Example 7 | 20.9 | 8.238 | 31.99 | 250 |
| Example 8 | 20.5 | 8.082 | 31.12 | 251 |
| Example 9 | 23.0 | 8.059 | 30.52 | 257 |
| Example 10 | 26.3 | 7.957 | 30.3 | 254 |
| Example 11 | 16.0 | 7.965 | 29.38 | 264 |
| Comparative example 1 | | not soluble | | |
| Comparative example 2 | | not soluble | | |
| Comparative example 3 | | not soluble | | |
| Comparative example 4 | | not soluble | | |

The comparison of examples 1, 9, and 10 shows that the use of methyl methacrylate is able to improve the thickening effect of the polymers, meaning that smaller amounts of polymer are required in order to adjust a base oil to a particular viscosity. The present data are especially surprising given that merely increasing the polarity of the polymer by using methacrylic acid is not sufficient to provide additives that can be used to achieve an improvement in the viscosity index in polar base oils.

TABLE 4

Additization of PAG 2

| Polymer from | Amount of polymer added in % | KV100 [mm²/s] | KV40 [mm²/s] | VI |
|---|---|---|---|---|
| — | — | 52.0 | 312.8 | 232 |
| Example 3 | 10.0 | 65.9 | 398.5 | 241 |
| Example 3 | 15.0 | 72.5 | 445.3 | 243 |

From tables 3 and 4 it is evident that by additizing PAG by means of the soluble PAMA described it is possible significantly to raise the viscosity indices of the PAGs. On account of the consequently reduced viscosity drop on increasing temperatures, the temperature service range from PAG in lubricant applications can be extended considerably.

In addition, the above-described carbon black spotting test was carried out.

Table 5 shows the evaluation after the laboratory dispersion tests for the dispersing VIIs (example 4-7 and 11) and two nondispersing VIIs (example 1 and 8). The experiments were carried out on the basis of the formulations set out in table 3. The polymers from examples 4 to 7 and 11 surprisingly display a capacity for very effective dispersing of the carbon black. This is manifested not only in the overall-higher overall evaluations in the spotting test, but also in the significantly reduced carbon black-related rise in the viscosity of the oils.

TABLE 5

Results of carbon black dispersing

| Polymer from | Evaluation of $1^{st}$ spotting [%] | Evaluation $2^{nd}$ spotting [%] | Overall evaluation [%] | KV 100° C. [mm$^2$/s] ASTM D445 |
|---|---|---|---|---|
| Example 1 | 24.7 | 23.4 | 24.1 | 79.27 |
| Example 4 | 83.9 | 86.5 | 85.2 | 15.59 |
| Example 5 | 76.7 | 77.9 | 77.3 | 20.93 |
| Example 6 | 43.9 | 45.3 | 44.6 | 35.40 |
| Example 7 | 86.1 | 85.1 | 85.6 | 33.24 |
| Example 8 | 24.1 | 22.6 | 23.4 | 70.70 |
| Example 11 | 64.5 | 65.3 | 64.9 | 25.84 |

The invention claimed is:

1. A (meth)acrylate polymer, comprising:

a) 5% to 60% by weight of a repeating unit derived from at least one (meth)acrylate of formula (I):

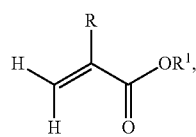

(I)

wherein R represents hydrogen or methyl, and $R^1$ represents an alkyl radical having 1 to 6 carbon atoms;

b) 5% to 65% by weight of a repeating unit derived from at least one (meth)acrylate of formula (II):

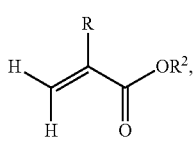

(II)

wherein R represents hydrogen or methyl, and $R^2$ represents an alkyl radical having 7 to 30 carbon atoms; and c) 60% to 90% by weight of a repeating unit derived from at least one (meth)acrylate of formula (III):

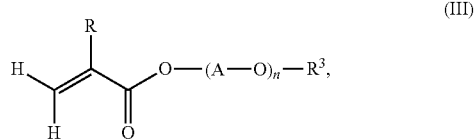

(III)

wherein R represents hydrogen or methyl, n represents a number in the range from 2 to 500, A represents $C_2$-$C_4$ alkylene, and $R^3$ represents a hydrogen atom or an alkyl radical having 1 to 4 carbon atoms.

2. The (meth)acrylate polymer of claim 1, comprising a repeating unit derived from at least one dispersing monomer selected from the group consisting of a heterocyclic vinyl compound, an aminoalkyl (meth)acrylate, an aminoalkyl (meth)acrylamide, and a heterocyclic (meth)acrylate.

3. The (meth)acrylate polymer of claim 1, comprising 0.5% to 10% by weight of a repeating unit derived from at least one dispersing monomer.

4. The (meth)acrylate polymer of claim 1, wherein the repeating unit of formula (III) is ETGMA.

5. The (meth)acrylate polymer of claim 1, wherein the repeating unit of formula (III) is selected from the group consisting of DMAPMA, DMAEMA, MOEMA and OEMA.

6. A lubricating oil composition, comprising:
a polar base oil comprising a polyalkylene glycol and the (meth)acrylate polymer of claim 1.

7. The (meth)acrylate polymer of claim 1, having a weight average molecular weight of from 40,000 to 100,000 g/mol.

8. A (meth)acrylate polymer, comprising:

a) 20% to 30% by weight of a repeating unit derived from at least one (meth)acrylate of formula (I):

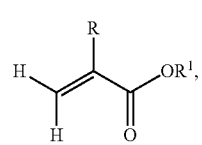

(I)

wherein R represents hydrogen or methyl, and $R^1$ represents an alkyl radical having 1 carbon atom;

b) 20% to 60% by weight of a repeating unit derived from at least one (meth)acrylate of formula (II):

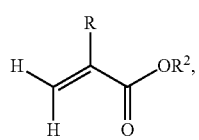

(II)

wherein R represents hydrogen or methyl, and $R^2$ represents an alkyl radical having 7 to 30 carbon atoms; and c) 30% to 60% by weight of a repeating unit derived from at least one (meth)acrylate of formula (III):

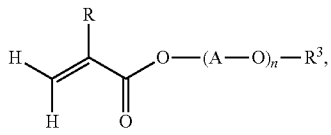

wherein R represents hydrogen or methyl, n represents a number in the range from 2 to 500, A represents $C_2$-$C_4$ alkylene, and $R^3$ represents a hydrogen atom or an alkyl radical having 1 to 4 carbon atoms.

9. The (meth)acrylate polymer of claim 8, comprising a repeating unit derived from at least one dispersing monomer selected from the group consisting of a heterocyclic vinyl compound, an aminoalkyl (meth)acrylate, an aminoalkyl (meth)acrylamide, and a heterocyclic (meth)acrylate.

10. The (meth)acrylate polymer of claim 8, comprising 0.5% to 10% by weight of a repeating unit derived from at least one dispersing monomer.

11. A lubricating oil composition, comprising a polar base oil and 1% to 30% by weight of the (meth)acrylate polymer of claim 8.

12. The lubricating oil composition of claim 11, wherein the polar base oil comprises a polyalkylene glycol.

13. The (meth)acrylate polymer of claim 8, wherein the repeating unit of formula (III) is selected from the group consisting of ETGMA.

14. The (meth)acrylate polymer of claim 9, wherein the repeating unit derived from at least one dispersing monomer is selected from the group consisting of DMAPMA, DMAEMA, MOEMA and OEMA.

15. The (meth)acrylate polymer of claim 8, having a weight average molecular weight of from 40,000 to 100,000 g/mol.

16. A lubricating oil composition, comprising:
a polar base oil comprising a polyalkylene glycol and the (meth)acrylate polymer of claim 8.

* * * * *